US012561646B2

(12) United States Patent

Wang et al.

(10) Patent No.: US 12,561,646 B2

(45) Date of Patent: Feb. 24, 2026

(54) SUPPLIER-SIDE PRODUCT PICKING LIST GENERATION METHOD AND SYSTEM

(71) Applicant: SHENZHEN MEIYUNJI NETWORK TECHNOLOGY CO., LTD, Guangdong (CN)

(72) Inventors: Zhichao Wang, ShenZhen (CN); Siying Wu, ShenZhen (CN); Songhui Mei, ShenZhen (CN); Chunwei Wang, ShenZhen (CN)

(73) Assignee: SHENZHEN MEIYUNJI NETWORK TECHNOLOGY CO., LTD, ShenZhen (CN)

( * ) Notice: Subject to any disclaimer, the term of this patent is extended or adjusted under 35 U.S.C. 154(b) by 76 days.

(21) Appl. No.: 18/660,990

(22) Filed: May 10, 2024

(65) Prior Publication Data

US 2024/0412159 A1 Dec. 12, 2024

(30) Foreign Application Priority Data

Jun. 8, 2023 (CN) .......................... 202310671004.1

(51) Int. Cl.
G06Q 10/087 (2023.01)

(52) U.S. Cl.
CPC .................................. G06Q 10/087 (2013.01)

(58) Field of Classification Search
CPC ............. G06Q 10/087; G06Q 10/0875; G06Q 30/0635; G06Q 30/0637; G06Q 10/10; Y02P 90/30; Y04S 10/50

(Continued)

(56) References Cited

U.S. PATENT DOCUMENTS

| | | | | |
|---|---|---|---|---|
| 8,121,874 B1 * | 2/2012 | Guheen | ................ | G06Q 10/087 705/28 |
| 2001/0018671 A1 * | 8/2001 | Ogasawara | .......... | G06Q 10/087 705/28 |

FOREIGN PATENT DOCUMENTS

| | | | | |
|---|---|---|---|---|
| CN | 114612009 A | * | 6/2022 | ........... G06Q 10/087 |
| CN | 117985375 A | * | 5/2024 | ......... G06Q 30/0639 |

(Continued)

OTHER PUBLICATIONS

<https://wetechideas.com/2023/01/11/10-wave-management/>, SAP Quick Guide, Pavan Pati, Jan. 11, 2023 (Year: 2023).*

*Primary Examiner* — Russell S Glass

(74) *Attorney, Agent, or Firm* — Maier & Maier, PLLC

(57) ABSTRACT

A supplier-side product picking list generation method and system, used for the order management module of the e-commerce ERP system or the e-commerce system, where the order management module receives order information of a target store, obtains product information contained therein, extracts corresponding product picking list template according to the product information, generates the first information group based on the product picking list template and the product information, generates wave tasks based on the order information and preset wave rules, generate the second information group based on the wave task and the product picking list template, generates the product picking list based on the first information group, the second information group and the extracted product picking list template. The embodiments are suitable for the order execution mode in which the supplier completes the picking after the merchant receives the order or the supplier picks the products before shipping.

7 Claims, 5 Drawing Sheets step S1: the order management module receives one or more order information from the target store, obtains product information contained in the order information, the product information includes product name information of the single product and product quantity information of the single product;

step S2: the order management module presets one or more product picking list templates, extracts the corresponding product picking list template according to the product information;generates the first information group according to the extracted product picking list template and the product information, wherein the extracted product picking list template is provided with supplier information corresponding to the product information;

step S3: the order management module contains preset wave rules, the order management module generates wave tasks based on the order information and the wave rules, generates the second information group according to the wave task and the extracted product picking list template;

step S4: the order management module generates a product picking list corresponding to the order information based on the first information group, the second information group and the extracted product picking list template.

(58) Field of Classification Search
USPC ........................................................... 705/28
See application file for complete search history.

(56) References Cited

FOREIGN PATENT DOCUMENTS

| | | | | | |
|---|---|---|---|---|---|
| KR | 20210148064 | A | * | 12/2021 | ............. G06Q 10/10 |
| KR | 20250039204 | A | * | 3/2025 | ......... G06Q 10/0633 |
| WO | WO-2019223529 | A1 | * | 11/2019 | ......... G06Q 10/0875 |

* cited by examiner step S1: the order management module receives one or more order information from the target store, obtains product information contained in the order information, the product information includes product name information of the single product and product quantity information of the single product;

step S2: the order management module presets one or more product picking list templates, extracts the corresponding product picking list template according to the product information;generates the first information group according to the extracted product picking list template and the product information, wherein the extracted product picking list template is provided with supplier information corresponding to the product information;

step S3: the order management module contains preset wave rules, the order management module generates wave tasks based on the order information and the wave rules, generates the second information group according to the wave task and the extracted product picking list template;

step S4: the order management module generates a product picking list corresponding to the order information based on the first information group, the second information group and the extracted product picking list template.

FIG. 1

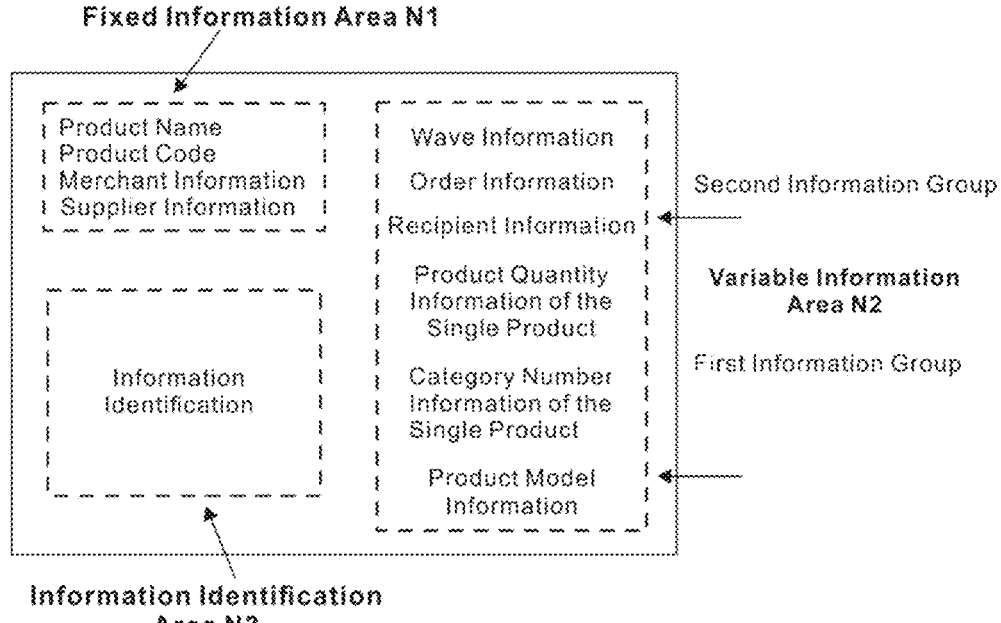

Fixed Information Area N1

Product Name
Product Code
Merchant Information
Supplier Information

Wave Information

Order Information

Recipient Information

Product Quantity Information of the Single Product

Category Number Information of the Single Product

Product Model Information

Second Information Group

Variable Information Area N2

First Information Group

Information Identification

Information Identification Area N3

FIG. 2

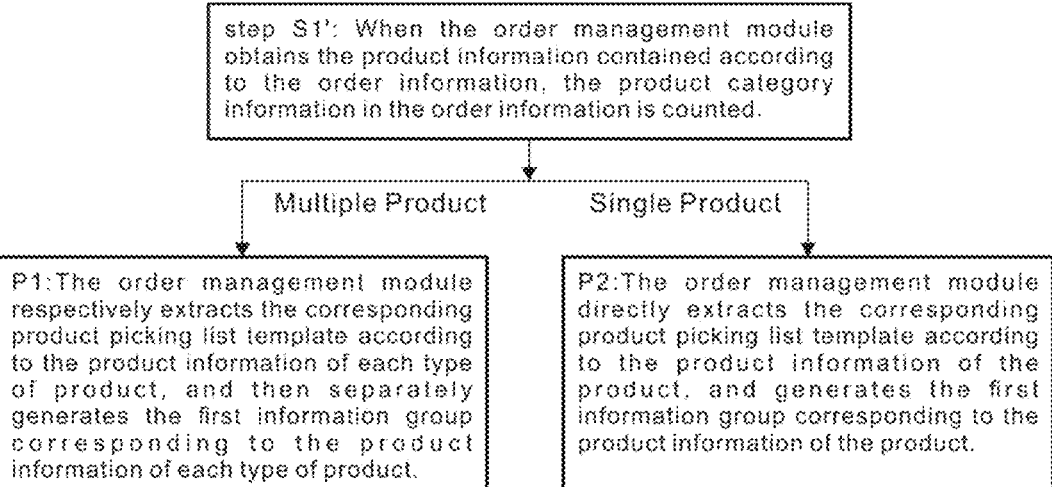
FIG. 3
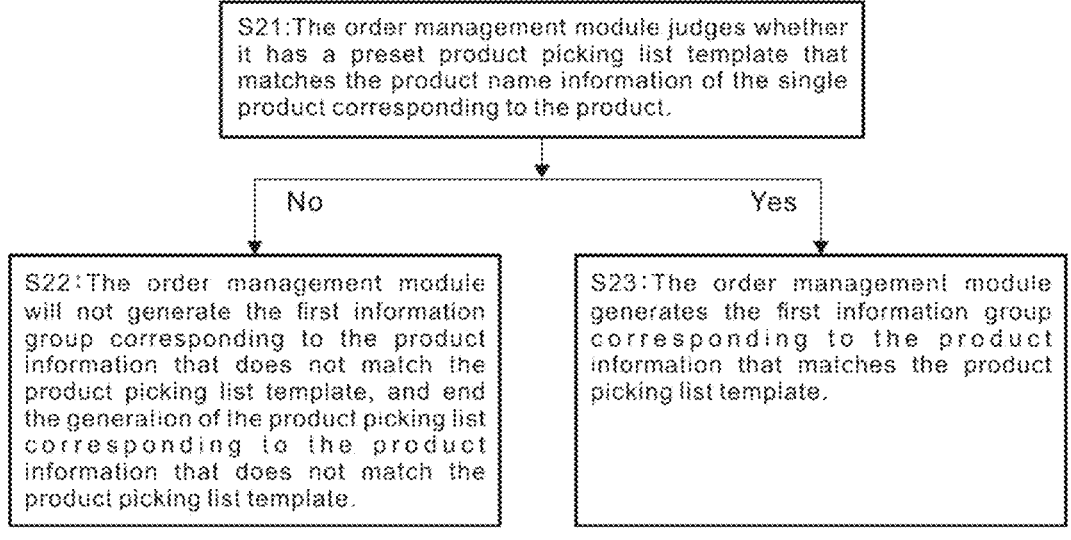
FIG. 4
S5:The e-commerce ERP system is provided with an information receiving method for the supplier to receive product picking list, and the order management module confirms the corresponding information receiving method based on the product picking list generated in step 4.
S6:Send the product picking list to the corresponding supplier.
FIG. 5

SUPPLIER-SIDE PRODUCT PICKING LIST GENERATION METHOD AND SYSTEM

TECHNICAL FIELD

The embodiments relate to the field of cross-border e-commerce order management, particularly to a supplier-side product picking list generation method and system.

BACKGROUND

The e-commerce ERP system accesses and controls online stores opened by merchants on e-commerce platforms through established rules, processes dynamic data in all aspects of online store operations, data management is numerous and jumbled, and it must also meet the operational convenience needs of multiple types of users (merchants); therefore, each functional module of the existing commercialized e-commerce ERP system is still in the stage of gradual updating and improving the functions. The e-commerce ERP system can be deeply connected with the e-commerce platform, helping domestic small and medium-size e-commerce sellers to uniformly manage the online stores of their e-commerce platforms, solving obstacles caused by language differences in the cross-border transaction process, enabling one operator to simultaneously manage hundreds of online stores, which can greatly improve the efficiency of online store operations.

The process of a product from production to sale usually includes multiple stages such as product design, raw material purchase, processing and production, inbound, sales, outbound, shipping, after-sales service, merchants or companies with self-built warehouses usually use wave shipment to process orders during the outbound process of products. Traditional wave shipment is to combine one or more orders into one wave according to certain rules and then pick and ship, this traditional wave shipment method is suitable for product sorting and outbounding from self-owned warehouse, manage warehouse products through shelves, cargo locations, product labeling, etc., can improve the efficiency and accuracy of warehouse operations, reduce the times of picking and shipping, and reduce warehouse costs and errors. When using the traditional wave shipment method to outbound the products, merchants or companies need to establish a unified internal management system, count information on the shelves, quantities, and product types of warehouse products, set sorting routes and sorting personnel for outbound products, this traditional wave shipment method also has higher requirements on the scale of merchants or companies at the same time.

In today's booming business development, an individual merchant or company often do not participate in all stages of a product's production to sale process, many merchants or companies choose not to produce the product themselves or only produce the core components of the product, by purchasing products from different suppliers or purchasing different accessories to combine into products, then ship the products to the recipient or provide the order information to the supplier, and the supplier ship the products directly to the recipient. During the transaction process of products, the merchant sells products in the same online store that may be provided by multiple different suppliers, thus after the merchant receives the order, different categories of products in the same order may be provided by different suppliers, or may be provided by the same supplier; or a single category of products in the same order may be provided by the same supplier, or by multiple different suppliers, the merchant and each suppliers generally belong to different warehouse management systems. The traditional wave shipment method is obviously not suitable for this kind of product supply method in which the merchant receives the order and then gets the products from the supplier before shipping, or the supplier picks and ships the products first when the merchant receives the order. The content contained in the existing product picking list cannot achieve rapid picking at the supplier's end. In particular, the existing product picking list can only be used after the merchant receives the order, the merchant first sends the product requirements to the supplier, the supplier then provides the products to the merchant, and finally the merchant ship the products to the buyer (that is, the consumer) of the store, this existing method of product shipping method has a long operation process and low shipping efficiency.

Other technical issues related to the embodiments will be further elaborated in the following text. The above content is only used to assist in understanding the technical solution of the embodiments, and does not mean that all the above content is prior art.

SUMMARY

A purpose of the embodiments is to provide a supplier-side product picking list generation method and system, to intelligently generate product picking lists, improve the processing efficiency of merchant target store orders, improve the supplier picking efficiency, and realize fast picking and shipping operations on the supplier side.

In order to achieve the above purpose, the embodiments propose a supplier-side product picking list generation method, which is applied to the order management module of the e-commerce ERP system or e-commerce platform system, the method includes:

step S1: the order management module receives one or more order information from the target store, obtains product information contained in the order information, the product information includes product name information of the single product and product quantity information of the single product;

step S2: the order management module presets one or more product picking list templates, extracts the corresponding product picking list template according to the product information; generates the first information group according to the extracted product picking list template and the product information, wherein the extracted product picking list template is provided with supplier information corresponding to the product information;

step S3: the order management module contains preset wave rules, the order management module generates wave tasks based on the order information and the wave rules, generates the second information group according to the wave task and the extracted product picking list template;

step S4: the order management module generates a product picking list corresponding to the order information based on the first information group, the second information group and the extracted product picking list template.

Other features and technical effects of the embodiments are explained in the later part of the introduction, the technical problem solving ideas and related product design plans of the embodiments are:

In the scenario where the supplier picks and provides the products or the supplier first picks the products and then ships, after the merchant (that is, the store seller) receives the order (that is, the store order), the merchant provides the corresponding product requirements in the order information to suppliers, the supplier provides corresponding products based on the product requirements provided by the merchant or directly send the products to the recipient based on the shipping information provided by the merchant. The current common solution for merchants to provide products to suppliers is that the merchant makes different product purchase information tables based on the order information and sends them to the suppliers. In the process of making product purchase information tables, merchants need to manually classify and process each order information received, this manual processing method is in low efficiency, especially when the orders are relatively concentrated, it is easy to make errors when recording the demand for distributed products, which will further affect the order processing speed of the online store. The applicant found that by presetting one or more product picking list templates in the order management module of the e-commerce ERP system or e-commerce platform system, the order management module receives the order information from the target store, first, confirms the corresponding product information based on the order information, extracts the product picking list template corresponding to the product information, generates the first information group corresponding to the product information; second, generates corresponding wave tasks based on the order information and preset wave rules, and generates the second information group corresponding to the wave tasks; finally, adds the first information group and the second information group to the extracted product picking list template to automatically generate the product picking list corresponding to the order information.

This product picking list generation method can quickly generate corresponding product requirements based on order information, improve the order information processing efficiency of online stores, simplify the operating steps of merchants (online store operators), especially after the product picking list is provided to the supplier, the supplier can identify and provide the corresponding products more clearly and efficiently, furthermore, the supplier can also ship the products according to the information content of the product picking list.

The supplier-side product picking list generation method disclosed in the embodiments is based on the product picking list template, based on the wave rules preset by the merchant, after the target store receives the order information, generates multiple corresponding product picking lists for the product information of multiple types of products included in the order information, more conveniently meet the picking needs on supplier-side. Secondly, because the same product may be supplied by different suppliers, that is, the order management module is set up with multiple product picking list templates for single items with the same product name information but different supplier information, in the process of matching the corresponding product picking list based on product information, the order management module confirms the corresponding recipient information according to the order information, and judges whether there is a product picking list generation record associated with the recipient information stored in the order management module based on the recipient information, this method of selecting the corresponding product picking list template based on the generated record of the product picking list, can meet the needs of scenarios where the same product is shipped separately by different suppliers. Thirdly, the advantage of the supplier-side product picking list generation method proposed in the embodiments is that by providing the fixed information area and the variable information area in the product picking list template, different styles of product picking lists for same products can be generated based on different shipping methods, which is convenient for human to intuitively identify the information of the first information group and the second information group. Finally, in order to further improve the efficiency of the supplier in obtaining the content of the product picking list, the product picking list template also has an information identification area, while generating product picking list, generates corresponding information identification based on the content of the product picking list, suppliers can quickly obtain the content of the corresponding product picking list by scanning the information identification. This product picking list generation method can greatly improve the processing efficiency of target store orders, and after the product picking list is generated, the merchant only needs to provide the product picking list to the corresponding supplier, then the supplier can quickly pick the products according to the product needs corresponding to the content of the product picking list or ship the products to the recipient after picking.

Furthermore, by setting different information areas on the product picking list template, the content of the product picking list disclosed in the embodiment combines both human eye recognition and scanning equipment scanning recognition, the product picking list generated based on the content of the embodiment has the characteristics of concise content, small size, and wide range of applications, the same product picking list can be used for supplier ordering, warehouse identification, product picking, order shipping and other aspects at the same time, the use of product picking lists is highly efficient. In addition, this method of generating product picking lists can unify the format of the identification content of the product picking lists shipped from the merchant side and the product picking lists shipped from the supplier side, simplify the generation and print operation of product picking lists, optimize the operation process after picking at the supplier side, improve the efficiency of the merchant side in generating product picking list, simplify the process of shipping from the supplier side to the merchant side, and improve the efficiency of product shipping at the supplier side.

The present application also provides a system corresponding to the method of generating a product picking list on the supplier side, including order management module, the order management module executes various operation instructions included in the supplier-side product picking list generation method described in the present application. The order management module includes:

a receiving unit used to receive order information of the target store;

a storage unit used to store product picking list templates, store preset wave rules;

a acquiring unit used to extract the product picking list template corresponding to the product name information of the single product, obtain the preset wave rules, and obtain the corresponding supplier information according to the extracted product picking list template;

a generating unit used to generate the product picking list corresponding to the order information.

Furthermore, in order to meet the fast picking on the supplier side, improve the efficiency of product picking on the supplier side, the product picking list template includes fixed information area, variable information area and information identification area, the order management module respectively generates the first information group and the second information group based on the content form of the product picking list template, wherein:

the fixed information area is used to identify one or more of merchant information, product name information of the single product, supplier information, and product code information;

the variable information area is used to identify the contents of the first information group and the second information group, wherein the first information group includes product quantity information of the single product, category number information of the single product, one or more of the recipient information; the second information group includes wave information and/or order information;

the order management module generates corresponding information identification according to the contents of the fixed information area and the variable information area, and adds them to the information identification area.

Declaration: As shown in FIG. 7, the e-commerce ERP system or e-commerce platform system of the present application can include one or more of the functional modules among product management module, sales management module, purchase management module, logistics management module, warehouse management module, financial management module, advertising management module, customer service management module, tool management module, permission management module and data management module, each functional module can be integrated with each other, and can exist independently, or one functional module can be a sub-module of another functional module. The operators of the e-commerce ERP system or e-commerce platform system in the present application can also be called store managers, sellers, operators, operating personnel or users, except for special declared, their identities are not strictly limited. If not specifically declared in the present application, commodity and product have the same meaning, merchant and merchant side have the same meaning, supplier and supplier side have the same meaning.

The meanings and explanations of terms in the field of e-commerce in the present application are as follows.

(1) ERP is enterprise resource planning, which can also be used as the abbreviation of e-commerce ERP system in the present application.

(2) Wave planning is a method to improve the picking operation rate, it combines different orders into one wave according to certain standards, to guide one picking process.

(3) Wave rule refers to the processing rules preset by merchants for automated processing of orders in the e-commerce ERP system or e-commerce platform system, which can be based on time units as one node, or on order quantity units as one node.

(4) Product code refers to a set of numerals used to identify products.

(5) Single product refers to a product category that contains specific attributes, that is, a single category; multi-product refers to multiple categories.

BRIEF DESCRIPTION OF THE DRAWINGS

The accompanying drawings are provided to further understand the present application and do not constitute limitations to the present application; the content shown in the drawings can include actual data from embodiments and falls within the scope of protection of the present application.

FIG. 1 is a flow diagram of the supplier-side product picking list generation method in one embodiment of the present application;

FIG. 2 is a structural diagram of a product picking list template in one embodiment of the present application;

FIG. 3 is a flow diagram of the first information group generation method in one embodiment of the present application;

FIG. 4 is a flow diagram of the first information group generation method in another embodiment of the present application;

FIG. 5 is a flow diagram of the method of sending product picking lists to suppliers in one embodiment of the present application;

DETAILED DESCRIPTION

In order to make the purpose, technical solutions, and advantages of the present application more clear, the following detailed description of an exemplary embodiment of the present application is provided with reference to the accompanying drawings. It should be understood that the exemplary embodiment described herein is only intended to explain the present application and is not intended to limit the present application.

Figure 6:
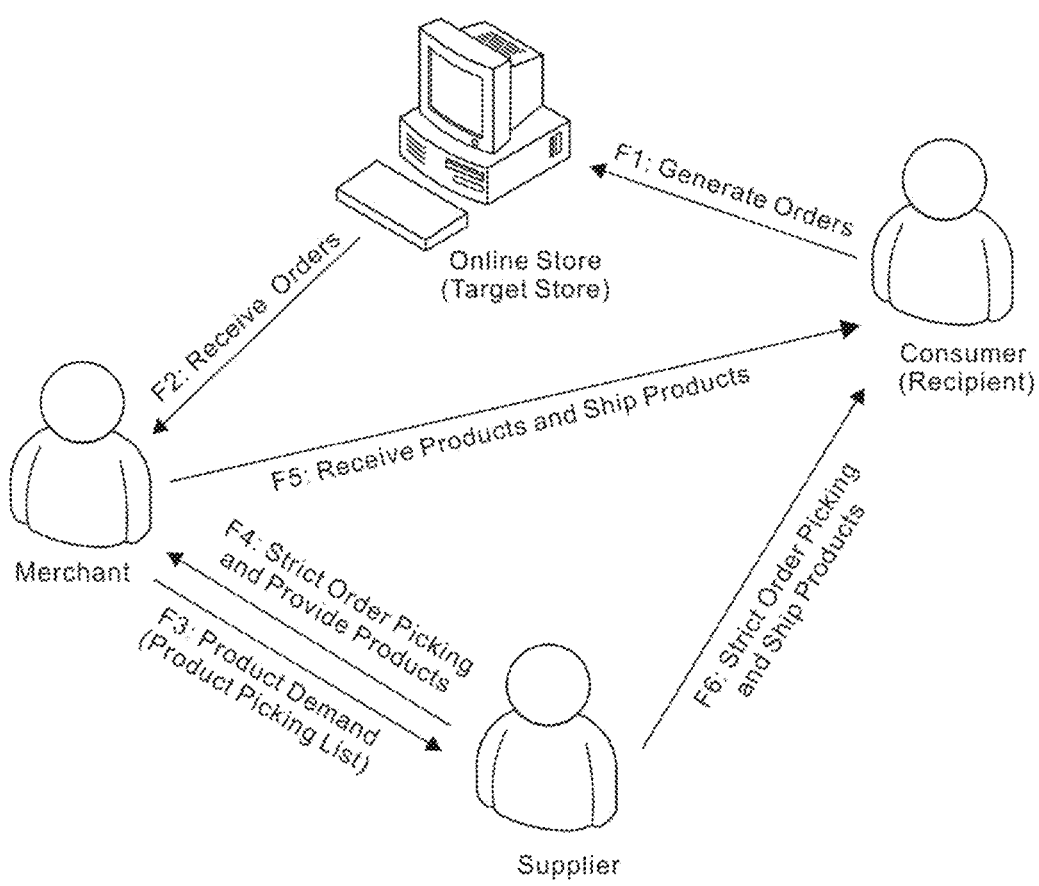
FIG. 6 is a diagram of the application scenario of product picking lists in one embodiment of the present application.

As shown in FIG. 6, a diagram of the application scenario of product picking lists in one embodiment of the present application, the content of the application scenario is mainly as follows: F1: The consumer purchases products through online stores and generate orders; F2: The merchant receives orders and confirms the demand for corresponding products; F3: The merchant provides the corresponding product demand (product picking list) to the corresponding supplier, F4: The supplier picks the products according to the product demand (product picking list) and provides the product to the corresponding merchant; F5: The merchant receives the products and ships them to the recipient. In another shipping method, the supplier can also ship directly to the recipient. That is, after the supplier receives the product demand (product picking list), F6: The supplier will follow the product demand (product picking list) to pick the products and ship the picked products to the recipient. The embodiments scenario in which merchants receive orders and suppliers provide products is widely used in current market transactions. For example, live streaming is a method in which the supplier distributes products and delivers them to the recipient based on the order information provided by the anchor.

As shown in FIGS. 1 to 8, the embodiments proposes a supplier-side product picking list generation method, use for the order management module of e-commerce ERP system, the product picking list generation method includes the following steps S1-S4.

Step S1: The order management module receives one or more order information from the target store, obtains product information contained in the order information, the product information includes product name information of the single product and product quantity information of the single product.

Figure 7:
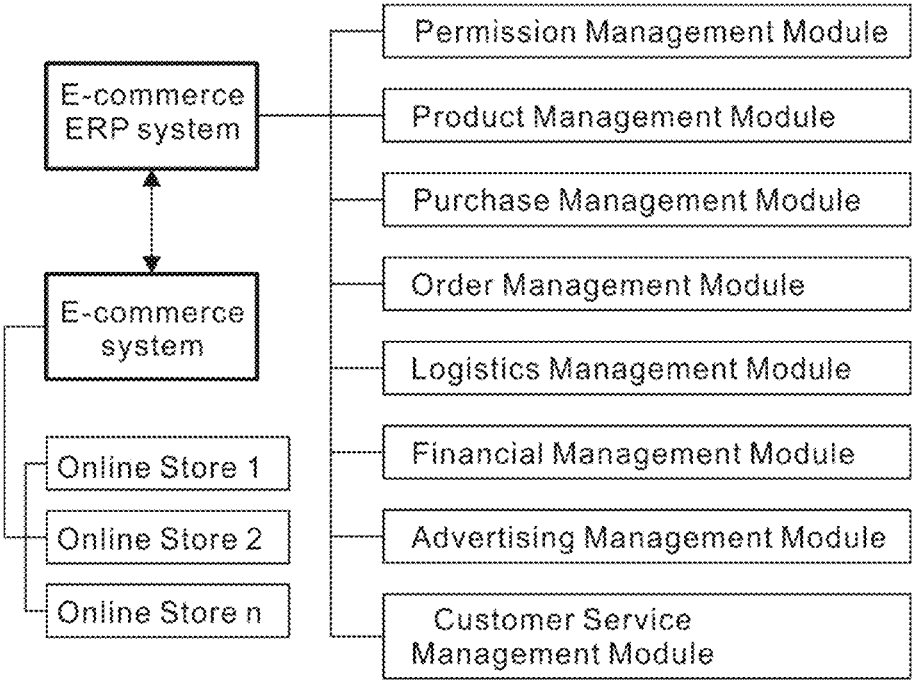
FIG. 7 is a structural diagram of the e-commerce ERP system in one embodiment of the present application

Specifically, the merchant has opened multiple online stores on the e-commerce platform system, such as online store 1, online store 2 . . . online store n, the merchant logs into the e-commerce ERP system and authorize their online stores to the system (as shown in FIG. 7), wherein the online store is the target store. The merchant logs in to the e-commerce ERP system, receives the order information of the target store through the order management module, the order management module obtains the product information contained in the order information confirmation, wherein the product information can include the product name information of the single product, the product quantity information of the single product, and product information may also include product model information, product specification information, product material information, etc.

In another embodiment, the product picking list generation method provided by fix present application can also be, the order management module identifies the order information to obtain the product information it contains, and judges whether the corresponding product contains multiple components based on the product information. If the corresponding product information contains multiple components, confirms the component information for each component respectively, confirms the supplier information corresponding to the component based on the component information, generates corresponding component picking list based on the component information and supplier information respectively, provides the component picking list to the corresponding supplier. If the corresponding product does not contain multiple components, the order management module directly generates the product picking list corresponding to the product information, by classifying tag different products, the shipping method of the corresponding product and the product picking list generation method can be more conveniently confirmed, and based on the shipping method and generation method arrange the picking tasks of the corresponding products, which improves the order information processing efficiency of the target store.

Step S2: The order management module is preset with one or more product picking list templates, extracts the corresponding product picking list template according to the product information, generates the first information group based on the extracted product picking list template and the product information, wherein the extracted product picking list template is provided with supplier information corresponding to the product information.

Specifically, the order management module is provided with one or more product picking list templates, the style of the product picking list template is shown in FIG. 2, wherein the content of the product picking list template can include the product name, product code, supplier information, merchant information, wave information, order information, recipient information, product quantity information of the single product, product model information, category number information of the single product, etc.

Step S3: The order management module contains preset wave rules, the order management module generates wave tasks based on the order information and the wave rules, generates the second information group according to the wave task and the extracted product picking list template.

Specifically, the order management module generates the single wave task based on the single order information and preset wave rules, or the order management module generates the single wave task based on multiple order information and preset wave rules, that is, the single wave task can contain only one order or multiple orders. If the single wave task contains multiple orders, when generating the second information group corresponding to the order information, the order management module 40 sequentially numbers the multiple orders, to simplify the content of generating the second information group.

In another embodiment, the order management module first generates the wave task based on the order information and preset wave rules, generates the corresponding second information group based on the content of the wave task, and then judges whether the corresponding product picking list template is stored in the module, if it is detected that all the products in the same order information do not match the corresponding product picking list template, the product information that does not match the corresponding product picking list will be marked and the corresponding order information will also be marked, and the corresponding wave tasks are regenerated based on the preset wave rules for other order information except the marked order information, and regenerate the corresponding second information group based on the regenerated wave tasks.

In another embodiment, the order management module can first generate corresponding wave tasks based on order information and preset wave rules, then confirm the corresponding product picking list template based on product information, and then generate the first information group and the second information group respectively, therefore, the supplier-side product picking list generation method proposed in the embodiment does not limit the order of step S2 and step S3.

Case 1: Generate the wave task in the order management module based on the preset wave rules (the number of the wave task is N, where N can be English letters, numbers, numeric strings or other characters in specific applications), including Order No. 1 and Order No. 2; Order No. 1 includes three types of product named product A, product B and product C, wherein the quantity of product A is 5, the quantity of product B is 4, and the quantity of product C is 4; Order No. 2 contains two types of product named product A and product D, wherein the quantity of product A is 7, the quantity of product D is 2. The order management module extracts the corresponding product picking list template according to the product information of each type of product and generates the first information group, generates the second information group based on the wave task and the extracted product picking list template, then the content of the first information group corresponding to product A in order No. 1 (category identification information of the single product and the quantity of the corresponding products in the order) can be "3-1, 5" (as shown in Table 1), and the content of the second information group (wave task number and order number information) can be "N, 1", wherein: "3-1" in the first information group of product A corresponds to the category identification information of the single product, and "3" indicates that product A corresponds to the number of single product included in the order is three categories, "1" indicates that product A is the category position of the corresponding order, that is, product A is the first category among the three categories of products included in the corresponding order; "5" indicates that the number of the product (product A) in the corresponding order is 5; "N" in the second information group indicates the number of the wave task, which can be expressed by the reduced number, that is, the wave task is the Nth wave tasks, "1" indicates the order number information, which corresponds to order No. 1 in the wave task, indicates the first order in the Nth wave task. That is, the first information group includes the category identification information X1 of the single product and the product quantity X2 of the single product in the corresponding order, the category identification information X1 of the single product, can be further divided into the category position X11 of the corresponding order and the quantity of single product X12 included in the corresponding order; the second information group includes the wave task number N and the order number information, thereby simplifying the identification of the first information group and the second information group, so that the generated product picking list can easily identify the name information of the specific single product, category identification information of the single product, product quantity information of the single product, wave information, order number information and other information with the human eye, to improve the efficiency of order execution.

The specific method is to decompose the product quantity information and the category number information of the single product into the category identification information of the single product and the quantity of the corresponding product in the order, and the category identification information of the single product and the quantity of the products in the corresponding order are formed into corresponding codes and marked on the product picking list; the wave information and the order information are decomposed into the number of the wave task and the order number information, and the number of the wave task and the order number information are formed into corresponding codes and marked on the product picking list.

Correspondingly, the content of the first information group corresponding to product B can be "3-2, 4", and the content of the second information group can be "N, 1"; the content of the first information group corresponding to product C can be "3-3, 4", the content of the second information group can be "N, 1"; the content of the first information group corresponding to product A in order 2 can be "2-1, 7", the content of the second information group can be "N, 2"; the content of the first information group corresponding to product D can be "2-2, 4", the content of the second information group may be "N, 2". As shown in Table 1, the contents of the first information group and the second information group are enumerated and explained in the form of table.

such as "single product" or "multiple product", when expressing the second information group, wave information and order information can also be combined and displayed in the form of character string, such as "N-1". If the wave task is generated based on a single order information, that is, a single wave task only contains one order information, then the second information group can only contain wave information or order information, can generate wave information by single, and also can generate order information by single, such as "N" or "1". This use of letters, numbers or character strings to represent the partial content of the first information group and the second information group can make the content information of the later generated product picking list generated clearer, and save the corresponding paper area of the product picking lists.

Step S4: The order management module generates the product picking list corresponding to the order information based on the first information group, the second information group and the extracted product picking list template.

Specifically, the order management module fills in the contents of the first information group and the second information group into corresponding areas of the corresponding product picking list template to generate the product picking list.

As shown in FIG. 2, in one embodiment, in order to distinguish multiple different product picking list templates, and in order to add the first information group and the second information group to the corresponding information area of the product picking list, the product picking list template includes fixed information area N1 and variable information area N2, wherein the fixed information area N1 is used to identify one or more of merchant information, product name, supplier information, and product code. The variable information area N2 is used to identify the contents of the first information group and the second information group, wherein the first information group may include one or more of recipient information, product quantity information of the single product, category number information of the single product, and product model information, the first information group may also include product material information, product origin information, etc., and the second information group may include wave information and/or order information.

In another embodiment, in order to facilitate the supplier to quickly input the information content contained in the

TABLE 1

| Order No. | The product name of the single product | The product quantity of the single product | The first information group (category identification information of the single product and the quantity of the corresponding products in the order) | The second information group (wave task number and order number information) |
|---|---|---|---|---|
| Order No. 1 | Product A | 5 | 3-1, 5 | N, 1 |
| Order No. 1 | Product B | 4 | 3-2, 4 | N, 1 |
| Order No. 1 | Product C | 4 | 3-3, 4 | N, 1 |
| Order No. 2 | Product A | 7 | 2-1, 7 | N, 2 |
| Order No. 2 | Product D | 2 | 2-2, 4 | N, 2 |

In another embodiment, as described in Case 1, when identifying the category identification information of the single product, other characters can also be used for display, product picking list into the supplier's own product sorting system, the product picking list template also includes the information identification area N3. The order management module generates the information identification of the product and fills in the value information identification area N3, the information identification includes all or part of the content in the fixed information area and the variable information area, wherein the information identification can be generated by the order management module based on the content of the product picking list, or generated by the order management module based on the order information. In actual scenarios, information identification can be displayed in the form of QR code or barcode, after the supplier receives the product picking list, the supplier can directly obtain the information content of the product picking list by scanning the QR code or barcode, which is convenient for suppliers to import the information content of product picking list into their own internal sorting system in time, optimize the steps for entering product picking list information on the supplier side, further meet the picking needs of different suppliers, expand the application scenarios of product picking list.

As shown in FIG. 3, in one embodiment, in order to generate the first information group corresponding to product information of multiple types of products, the order management module also includes confirming whether the product contained in the order information is single product or multiple product when acquiring the product information contained in the order information, the main contents are as follows.

S1': When the order management module obtains the product information contained in the order information, it confirms whether the product contained in the order information is single product or multiple product.

Specifically, if the product sold by the target store is multiple types of product (that is, multiple product), when the order management module obtains the product information contained in the order information, it confirms whether the product contained in the order information is single product or multiple product. Because, different products may be provided by the same supplier or by different suppliers; similarly, the content contained in the variable information area N2 of the product picking list template corresponding to the product information of different products may also be different, therefore, when the order management module confirms the product information based on the order information, it also needs to confirm that the product included in the order information is single product or multiple product, if the product type sold by the target store is unique product type, the order management module directly confirms the product information of the unique product as single product, and generates the corresponding first information group based on the product information of the unique product.

P1: If the product type included in the order information is multiple product, the order management module will extract the corresponding product picking list template according to the product information of each product type, and then generates the first information group corresponding to the product information of each type of product respectively.

Specifically, if the product type included in the order information is multiple product, the order management module 40 sorts all the products in the order information by category, and when generating the category information identification of the products according to the product picking list template, use the form of character string to express the product category information (such as "3-1" shown in Case 1), and then the order management module extracts the corresponding product picking list template based on the product information of each type of product, and finally generates into the first information group corresponding to the product information of each type of product respectively.

P2: If the product type included in the order information is single product, the order management module directly extracts the corresponding product picking list template according to the product information of the product type, and generates the first information group corresponding to the product information of the product.

Specifically, if the product sold by the target store is unique product (that is, single product), the order management module 40 receives the order information, directly extracts the product picking list template corresponding to the product information of the unique product, and generates the first information group corresponding to the product information of the unique product.

As shown in FIG. 4, in another embodiment, in order to more quickly match the corresponding product picking list template, in the process of extracting the product picking list template corresponding to the product information in the order management module according to the product information, also includes steps S21 to S23.

Step S21: The order management module judges whether it has a preset product picking list template that matches the product name information of the single product.

Step S22: If there is no preset product picking list template matching the product name information of the single product, the order management module will not generate the first information group corresponding to the product information that does not match the product picking list template, and end the generation of the product picking list corresponding to the product information that does not match the product picking list template.

In one embodiment, if the order management module does not match the corresponding product picking list template based on the product name information of the single product, the order management module does not generate the first information group corresponding to the product information, and marks the product.

Step S23: If there is a preset product picking list template that matches the product name information of the single product, the order management module will generate the first information group corresponding to the product information that matches the product picking list template.

In another embodiment, if the order management module detects that all the products contained in the same order information do not match the corresponding product picking list template, the order management module will mark the order information, and generate corresponding wave tasks based on the remaining order information and the preset wave rules except the unmatched order information, generate the second information group based on the wave task and the extracted product picking list template corresponding to the remaining order information except the unmatched order information.

Case 2, for example order No. 5 includes product Z, the order management module does not match the corresponding product picking list template based on the product information of product Z, then the order management module marks product Z, and marks order No. 5, when generating wave tasks according to the preset wave rules, the order No. 5 will not be counted.

In another embodiment, the product included in the order corresponding to the product is multiple product, if only part of the product do not match the corresponding product picking list template, the order management module only marks the product information of the part of products that have not been successfully matched, and generates the corresponding first information group according to the corresponding product picking list template for successfully matched products.

In another embodiment, the merchant can set corresponding inventory for multiple product picking list templates corresponding to the same product from different suppliers, and the order management module selects the corresponding product picking list template based on the product information and inventory information, and generates the corresponding first information group based on the product information and product picking list template, which can reduce the picking pressure of a single supplier, improve the supplier's picking efficiency.

In another embodiment, the order management module identifies the order information, confirms the product quantity information of the corresponding single product, generates the product picking list for individual product based on the product quantity information of the single product, and sends the product picking list of individual product to the corresponding supplier, the supplier pastes the individual product picking list on individual product, to facilitate merchants to conduct after-sales tracking of individual product.

Furthermore, because the same type product may be provided by different suppliers, the order management module is preset with multiple product picking list templates with the same product name information of the single product but different suppliers, in step S2, when the order management module obtains the product information contained in the order information, the order management module is also used to obtain the recipient information contained in the order information, based on the recipient information, judge whether the order management module has the product picking list generation record associated with the recipient information.

If there is a product picking list generation record associated with the recipient information, select the product picking list template corresponding to the product name information of the single product according to the product picking list generation record, then select the product picking list template according to the product picking list generation record, generate the first information group corresponding to the product information and the selected product picking list.

If there is no product picking list generation record associated with the recipient information, then obtain the latest product picking list template matching record corresponding to the product name information of the single product, confirm the corresponding product picking list template according to the latest product picking list template matching record, generate the corresponding first information group according to the product picking list template confirmed by the matching record between the product information and the latest product picking list template.

As shown in FIG. 5, in order to send the product picking list to the corresponding supplier, after the product picking list for the supplier side proposed in the embodiment is generated, the following step S5 and step S6 are also included.

Step S5: The e-commerce ERP system is provided with an information receiving method for the supplier to receive the product picking list, the order management module confirms the corresponding information receiving method based on the product picking list generated in step S4.

Step S6: Send the product picking list to the corresponding supplier.

Specifically, the e-commerce ERP system is provided with an information receiving method for the supplier to receive product picking list, the order management module confirms the corresponding supplier information based on the content of the generated product picking list, and extracts the supplier's receiving method stored in the system, generates the content corresponding to the product picking list generation and the supplier's receiving method and send it to the supplier side.

Specifically, the order management module confirms the communication method of the corresponding supplier based on the information receiving method of the supplier stored in the system, sends the generated product picking list to the corresponding supplier, there can be multiple ways of receiving information from the supplier side, including one or more of email, chat box, paper slip, etc., the order management module sends the product picking list to the corresponding supplier in different forms according to different receiving methods. For example, send the product picking list to the corresponding supplier's email address by email, or generate a product picking list in the form of a picture and send it to the corresponding supplier through information chat through WeChat, QQ, etc., or the order management module connected to the printer, the product picking list is generated through the printer and sent to the corresponding supplier by the merchant, the corresponding supplier sorts and provides the corresponding products to the merchants based on the content of the product picking list, and sends the product picking list to the corresponding supplier through multiple channels, making it easier for the merchant to distribute the product picking list to the corresponding supplier more quickly and efficiently.

In another embodiment, the e-commerce ERP system includes multiple permission levels, merchants and suppliers respectively have their own accounts in the e-commerce ERP system and corresponding permission levels, after the product picking list is generated on the merchant side, it is sent to the supplier side of the same e-commerce ERP system, which realize automated processing of order information, improve the order processing efficiency of the target store.

In another embodiment, when the order management module confirms the supplier information corresponding to the product picking list, it matches the product picking list templates of multiple different suppliers for a single category of products in the same order information based on the product quantity information, and the first information groups corresponding to multiple different suppliers are respectively generated, furthermore, product picking lists corresponding to multiple different suppliers are generated, the order management module obtains the receiving end information of multiple suppliers respectively, send product picking lists from multiple different suppliers to the corresponding supplier side.

Figure 8:
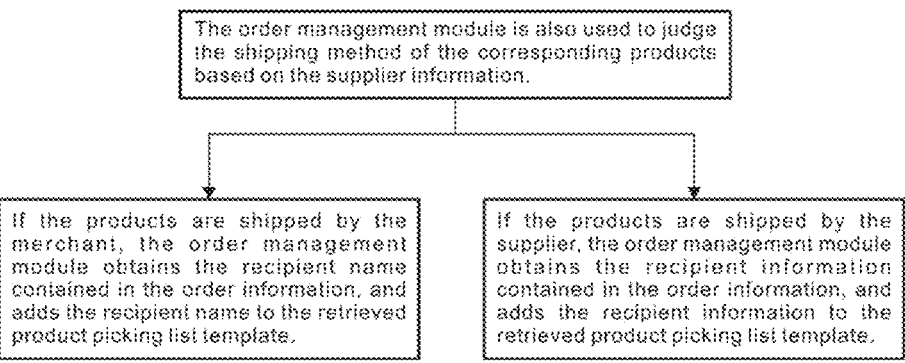
FIG. 8 is a structural diagram of the product picking list application scenario in another embodiment of the present application.

As shown in FIG. 8, in one embodiment, in order to facilitate the supplier to pick products according to the product picking list and ship directly to the recipient, to simplify the operation steps on the supplier side, the order management module is also used to judge the shipping method of the corresponding product based on the supplier information. If the products are shipped by the merchant, the order management module obtains the recipient name contained in the order information, and adds the recipient name to the extracted product picking list template; If the products are shipped by the supplier, the order management module obtains the recipient information contained in the order information, and adds the recipient information to the extracted product picking list template, wherein the recipient information includes one or more of the recipient name, recipient address, and recipient contact information.

Figure 9:
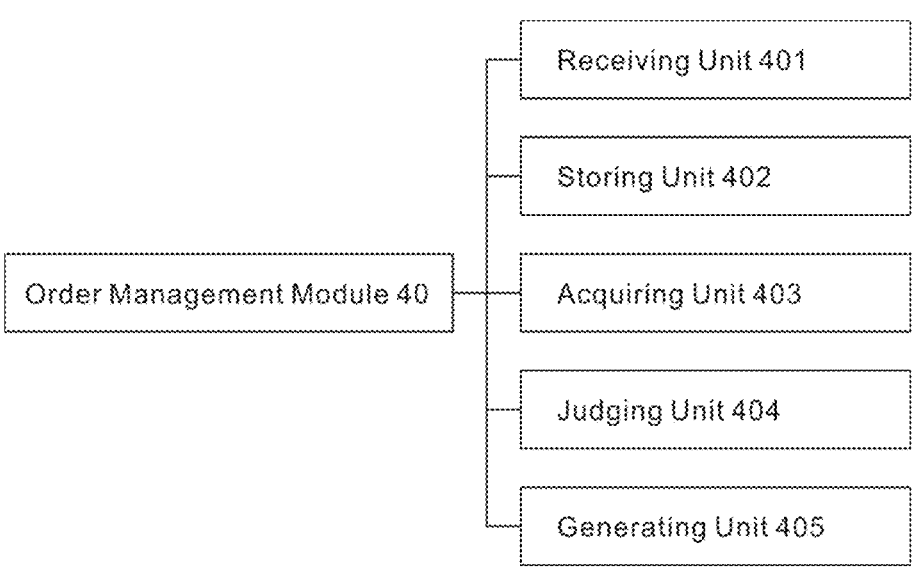
FIG. 9 is a structural diagram of the order management module in one embodiment of the present application.

As shown in FIG. 9, which is the structural diagram of the order management module in one embodiment of the present application, a supply-side product picking list generation system includes order management module 40, the order management module 40 specifically includes the following content.

The receiving unit 401, is used to receive order information from the target store; confirm the included product information according to the order information, wherein the product information includes: product name information of the single product, product quantity information of the single product.

The storage unit 402, is used to store one or more product picking list templates, store preset wave rules.

In one embodiment, the order management module receives the merchant preset information, generates the preset wave rules based on the preset information, such as the merchant sets up to generate corresponding wave rules for nodes based on time periods, or sets up to generate corresponding wave rules for nodes based on order quantity, etc., wherein the preset wave rules can be preset by the merchant, or automatically set by the e-commerce ERP system.

The acquisition unit 403, is used to extract the product picking list template corresponding to the product name information of the single product, obtain the preset wave rules, and obtain the corresponding supplier information according to the extracted product picking list template.

The generating unit 405, is used to generate the product picking list corresponding to the order information.

Specifically, the generating unit 405 is also used to generate the first information group based on the product information and the extracted product picking list template, and is used to generate the wave task based on the order information and the wave rule, generate the second information group according to the wave task and the extracted product picking order template, used to generate the product picking list corresponding to the order information based on the first information group, the second information group and the extracted product picking list.

In another embodiment, the order management module may also include the following content.

The receiving unit 401 is also used to when obtaining the product information contained in the order information, confirm that whether the product contained in the order information is single product or multiple product. If the product contained in the order information is multiple product, the generating unit 405 is also used to number each type of products in sequence, and extracts the corresponding product picking list template according to the product information of each product type, generates multiple first information groups corresponding to the product information of each product type respectively. If the product contained in the order information is single product, the generation unit 405 directly extracts the corresponding product picking list template according to the product information of the product, and generates the first information group corresponding to the product information of the product.

The judging unit 404, is used to judge whether there is a preset product picking list template in the order management module that matches the product name information of the single product according to the product information. If the order management module does not preset a product picking list template that matches the product name information of the single product, the order management module does not generate the first information group corresponding to the product information, end the product picking list generation; If the order management module has a product picking list template that matches the product name information of the single product, the order management module generates the first information group corresponding to the product information.

Furthermore, the judging unit 404 is also used to confirm the matching situation of multiple types of products in the same order information with the product picking list. If all the products in the same order information do not match the corresponding product picking list template, the order management module 40 marks the order information and generates a corresponding wave task for the remaining order information except the marked order information, and generates the second information group based on the remaining order information except the marked order information and the corresponding wave task.

In another embodiment, the order management module 40 also includes a sending unit (not shown in FIG. 9), the obtaining unit 403 confirms the corresponding receiving end information according to the supplier information, after the generating unit 405 generates the product picking list, the sending unit sends the generated product picking list to the corresponding supplier receiving end.

In another embodiment, the acquisition unit 403 is also used to confirm the recipient information based on the order information, judge whether there is a product picking list generation record related to the recipient stored in the order management module based on the recipient information. If so, then the system matches the product information and the product picking list template according to the storage record, furthermore, the acquisition unit 403 confirms the recipient address information according to the order information, sending unit sends the recipient address information to the shipping fee management module, the shipping fee management module generates logistics order information based on the recipient address information.

The order management module of the embodiments can also be set up on the e-commerce platform system, to process orders from online stores, and generate corresponding product picking lists based on the product information in the orders.

The above description is only an exemplary embodiment of the present application, and the scope of the present application is not limited thereto. Any equivalent transformations made under the conception of the present application, using the content of the present application and the accompanying drawings, or directly/indirectly applying in other related technical fields are also included within the scope of the patent protection of the present application.

What is claimed is:

1. A method, for an order management module of an e-commerce ERP system or an e-commerce platform system, the method comprising:

step S1: the order management module receives order information from a target store, obtains product information contained in the order information, the product information includes product name information of a single product and product quantity information of the single product;

step S2: the order management module presets one or more product picking list templates, extracts a corresponding product picking list template according to the product information; generates a first information group according to the extracted product picking list template and the product information, wherein the extracted product picking list template is provided with supplier information corresponding to the product information; the first information group includes category identification information of the single product and a product quantity of the single product in the corresponding order, the category identification information of the single product includes a category position number of the corresponding order and a quantity of the single product included in the corresponding order, the category identification information and the corresponding product quantity of the single product are combined and displayed in the form of a character string;

step S3: the order management module contains wave rules, the order management module generates wave tasks based on the order information and the wave rules, generates a second information group according to the wave tasks and the extracted product picking list template, the second information group includes a wave task number and order number information, the wave task number and the order number information are combined and displayed in the form of a character string; and step S4: the order management module generates a product picking list corresponding to the order information based on the first information group, the second information group, and the extracted product picking list template; when the order information includes multiple types of products, generates multiple corresponding product picking lists for the product information of the multiple types of products;

the product picking list template includes a fixed information area, a variable information area and an information identification area, the fixed information area is used to identify one or more of merchant information, product name information of the single product, supplier information, and product code information, the variable information area is used to identify the contents of the first information group and the second information group, the information identification area includes information identification, and the information identification is used to obtain the content of the corresponding product picking list by scanning the information identification on the supplier side.

2. The method according to claim 1, wherein step S2 further includes judging whether the product type included in the order information is a single product or a multiple product:

when the product type included in the order information is the multiple product, the order management module extracts the corresponding product picking list template according to the product information of each product type, and then generates the first information group corresponding to the product information of each product type respectively, and when the product type included in the order information is the single product, the order management module directly extracts the corresponding product picking list template according to the product information of the product type, and generates the first information group corresponding to the product information of the product type.

3. The method according to claim 2, wherein in step S2, when extracting the product picking list template corresponding to the product information in the order management module according to the product information, the order management module judges whether it has a preset product picking list template that matches the product name information of the single product;

when there is no preset product picking list template that matches the product name information of the single product, the order management module will not generate the first information group corresponding to the product information that does not match the product picking list template, and end the generation of the product picking list corresponding to the product information that does not match the product picking list template; and when there is a preset product picking list template that matches the product name information of the single product, the order management module will generate the first information group corresponding to the product information that matches the product picking list template.

4. The method according to claim 2, wherein step S2 further includes marking the products in the order information for which the product picking list template has not been extracted;

when some products in the same order information do not extract the corresponding product picking list template, then mark the products that have not extracted the corresponding product picking list template, and end the generation of the product picking list corresponding to the product for which the corresponding product picking list template has not been extracted; and when all the products in the same order information have not extracted the corresponding product picking list template, then mark all the products in the same order information that have not extracted the corresponding product picking list template, mark the corresponding order information, and in the subsequent step S3, do not generate the wave task corresponding to the marked order information.

5. The method according to claim 1, wherein the order management module is preset with multiple product picking list templates with the same product name information but different supplier information, and wherein, in step S2, when the order management module obtains the product information contained in the order information, the order management module is also used to obtain the recipient information contained in the order information, based on the recipient information, and judge whether the order management module has the product picking list generation record associated with the recipient information:

when there is a product picking list generation record associated with the recipient information, select the product picking list template corresponding to the product name information of the single product according to the product picking list generation record, and generate the first information group corresponding to the product information and the selected product picking list; and when there is no product picking list generation record associated with the recipient information, obtain the latest product picking list template matching record corresponding to the product name information of the single product, confirm the corresponding product picking list template according to the latest product picking list template matching record, and generate the first information group corresponding to the product information and the product picking list template confirmed based on the latest product picking list template matching record.

6. The method according to claim 1, wherein the order management module judges the shipping method of the corresponding product based on the supplier information, by judging whether the product is shipped by the merchant or by the supplier, and the order management module adds the recipient information corresponding to the order information to the product picking list template based on the corresponding shipping method, wherein the recipient information includes recipient name information, recipient address information, and contact information:

when the product is shipped by the merchant, the order management module obtains the recipient name information contained in the order information, and adds the recipient name information to the extracted product picking list template;

when the product is shipped by the supplier, the order management module obtains the recipient information contained in the order information, and adds the recipient information to the extracted product picking list template.

7. A product picking list generation system, comprising:

the order management module configured to execute the operation instructions included in the method in claim 1, and the order management module comprises:

a receiving unit that is configured to receive order information of the target store;

a storage unit that is configured to store one or more product picking list templates and wave rules;

an acquiring unit that is configured to:

extract the product picking list template corresponding to the product name information of the single product, obtain the wave rules, and obtain the corresponding supplier information according to the extracted product picking list template; and a generating unit that is configured to generate the product picking list corresponding to the order information.

* * * * *